UNITED STATES PATENT OFFICE 2,195,623

SPONGE RUBBER

Marion W. Harman, Nitro, W. Va., assignor to Monsanto Chemical Company, St. Louis, Mo., a corporation of Delaware No Drawing. Application September 1, 1937, Serial No. 161,995

8 Claims. (Cl. 260—724)

The present invention relates to a novel process for producing a superior quality of so-called sponge rubber.

In the preparation of sponge or cellular rubber there are in general two methods of procedure. These are to employ an inert gas which is introduced into the rubber and maintained under pressure during the vulcanization or to incorporate a material which decomposes during the vulcanization to liberate gases which in turn cause the rubber to swell and produce a cellular structure.

The use of an inert gas requires special equipment and a troublesome handling of gas. In addition to the inherent inconvenience of this method the sponge rubber product lacks homogeneity both as to the size and distribution of the pores and it is usually more satisfactory to incorporate a heat decomposable material with the rubber. Ordinary baking soda is a familiar example of a material so employed. Baking soda, however, does not mix readily with rubber and tends to "bloom" or separate on the surface. Furthermore, the sponge rubber product is never uniform but contains a wide variety of different sized pores which weaken the structure and render it less resistant to wear. Another disadvantage in the use of many blowing agents and particularly baking soda lies in their selective action toward the accelerator employed in vulcanizing the rubber. Thus the blowing action is not satisfactory with rubber stocks containing some accelerators and in consequence only certain ones may be so employed. It is highly desirable to have a blowing agent which will permit the use of any accelerator as well as one which will uniformly mix into the rubber. The decomposition temperature is preferably so related to the vulcanizing temperature that the break down is effected before vulcanization has set the rubber and eliminated the chance for further expansion. If the material decomposes too slowly at vulcanizing temperatures, sufficient porosity can not be obtained.

It is an object of the present invention to provide a sponge rubber product of improved properties.

It is a further object to provide a sponge rubber product of uniform pore size and fine texture.

It is a further object of the invention to provide a class of compounds which, when incorporated in a typical rubber stock, produce an improved sponge rubber. Other objects will be hereinafter shown.

It has been discovered that the salts of bis(imino, amino methyl) disulfide, when incorporated in a typical rubber stock, are excellent blowing agents.

The preferred class of materials comprise compounds of the following structure

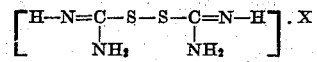

where X is an organic or inorganic acid capable of forming a salt thereof.

Examples of the preferred class of materials are bis(imino, amino methyl) disulfide oxalate; bis(imino, amino methyl) disulfide nitrate; bis(imino, amino methyl) disulfide sulfate; bis(imino, amino methyl) disulfide hydrochloride; and bis(imino, amino methyl) disulfide hydrobromide. These are all well known compounds described in Beilsteins Handbuch der Organischen Chemie, 4th ed. Vol. III, p. 194 or in the supplement, Vol. III, p. 78.

As a further specific example of the present invention bis(imino, amino methyl) disulfide hydrobromide was prepared following the procedure outlined in the Journal of the Chemical Society 51, p. 378 (1887) and incorporated in a typical rubber stock comprising

| | |
|---|---|
| Smoked sheets | 100 |
| Zinc oxide | 3 |
| Sulfur | 3 |
| Whiting | 50 |
| A blended mineral and vegetable oil | 5 |
| Stearic acid | 1 |
| 2,4 dinitro phenyl benzothiazyl sulfide | 1 |

The parts are by weight and to this base stock was added 3 parts by weight of bis(imino, amino methyl) disulfide hydrobromide. It was found on vulcanizing in a mold at the temperature of 50 pounds steam pressure per square inch that the rubber had expanded substantially 80% in volume. It was found on examining the stock further that it was permeated throughout with a multiplicity of very fine pores of uniform size.

As a further specific example the hydrochloride of bis(imino, amino methyl) disulfide was prepared and tested in an analogous manner by incorporating 3 parts by weight in the above described base stock and found on vulcanizing to exhibit the properties of the preferred class of materials. The rubber stock had expanded substantially 100% after vulcanizing. The product was of a uniform quality and exhibited no large pores.

As a still further specific example the oxalate of bis(imino, amino methyl) disulfide was prepared and as in the previous examples 3 parts by weight incorporated in the hereinbefore described base stock. On vulcanizing, the stock increased substantially 122% in volume and the sponge stock so formed was of a uniform cellular structure. A sample of the unvulcanized stock was then cured in open steam at 275° F. and a sponge rubber was produced which exhibited a multitude of very small pores of uniform size and distribution. To determine whether or not the bis(imino, amino methyl) disulfide oxalate would function satisfactorily at 70° C., pieces of the unvulcanized rubber stock were placed in a Geer oven at 70° C. A sponge rubber was produced exhibiting the typical properties of the cellular rubber produced by the incorporation of the compounds of the present invention.

It is often desirable to conceal the cellular structure of a rubber article and this is readily accomplished by the present invention in that the sponge rubber product which is produced by vulcanizing rubber having incorporated therein a small proportion of a salt of a bis(imino, amino methyl) disulfide has an appreciable rind of smooth substantially non-porous rubber on the surface which conceals the porous structure beneath the surface. The preferred materials of the present invention mix readily with rubber and do not bloom out after once being incorporated therein. A further advantage in the present invention rests in the fact that sponge stocks of uniform cellular structure are obtainable without the use of special equipment. Ordinary rubber vulcanizing molds and the equipment ordinarily employed in the preparation of vulcanizable rubber compounds are sufficient.

The present invention is not limited to the examples described above which are intended to be merely illustrative of the invention. While the preferred class of compounds are advantageously employed in relatively small proportions, other proportions than those specifically mentioned may obviously be employed, nor is the invention limited to the specific composition disclosed but pertains broadly to any vulcanizable rubber or rubber like composition. The invention is limited solely by the following claims.

What is claimed is:

1. A process of producing sponge rubber which comprises heating rubber, sulfur and an accelerator of vulcanization in the presence of a salt of bis(imino, amino methyl) disulfide.

2. A process of producing a sponge rubber which comprises heating rubber, sulfur and an accelerator of vulcanization in the presence of bis(imino, amino methyl) disulfide hydrobromide.

3. A process of producing a sponge rubber which comprises heating rubber, sulfur and an accelerator of vulcanization in the presence of bis(imino, amino methyl) disulfide hydrochloride.

4. A process of producing a sponge rubber which comprises heating rubber, sulfur and an accelerator of vulcanization in the presence of bis(imino, amino methyl) disulfide oxalate.

5. A vulcanizable rubber composition having incorporated therein sulfur, an accelerator of vulcanization and a salt of bis(imino, amino methyl) disulfide.

6. A vulcanizable rubber composition having incorporated therein sulfur, an accelerator of vulcanization and bis(imino, amino methyl) disulfide hydrobromide.

7. A vulcanizable rubber composition having incorporated therein sulfur, an accelerator of vulcanization and bis(imino, amino methyl) disulfide hydrochloride.

8. A vulcanizable rubber composition having incorporated therein sulfur, an accelerator of vulcanization and bis(imino, amino methyl) disulfide oxalate.

MARION W. HARMAN.